March 27, 1962 O. N. BRYANT 3,026,889
MECHANISM FOR CONTROLLING ADMISSION OF HOT
MOTIVE FLUID TO A PRIME MOVER
Filed Aug. 8, 1960 2 Sheets-Sheet 2

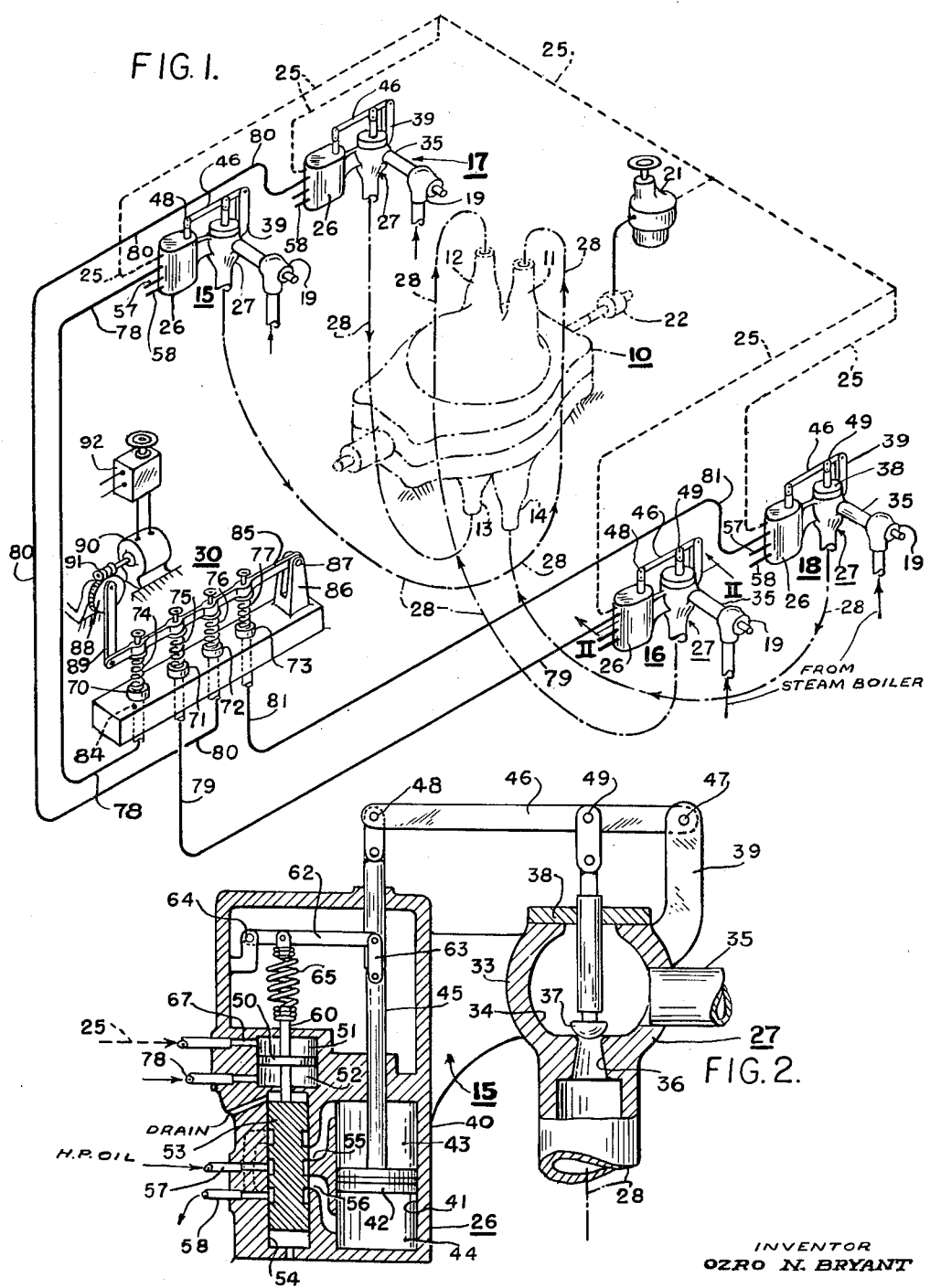

INVENTOR
OZRO N. BRYANT
BY Frank Cristiano Jr.

3,026,889
MECHANISM FOR CONTROLLING ADMISSION OF HOT MOTIVE FLUID TO A PRIME MOVER

Ozro N. Bryant, Chester, Pa., assignor to Westinghouse Electric Corporation, East Pittsburgh, Pa., a corporation of Pennsylvania
Filed Aug. 8, 1960, Ser. No. 48,264
6 Claims. (Cl. 137—18)

This invention relates to governing mechanisms for prime movers driven by elastic motive fluid, more particularly for prime movers driven by hot elastic motive fluid such as steam, and has for an object to provide governing mechanism for controlling admission of the hot motive elastic fluid to the prime mover in one manner during starting and in another manner when the prime mover assumes its normal running speed and load is applied thereto.

A further object is to provide governing apparatus of the above type including a plurality of governing valve mechanisms for controlling steam admission to the turbine during starting and after the turbine assumes its rated speed and the load is applied thereto, and further including a mechanism for modifying the regulation of the governing valves in such a manner that, during starting, all of the governing valves jointly move to the open position and remain open during assumption of the load by the turbine, while after such assumption of the load by the turbine the governing valves operate sequentially.

A still further object is to provide a governing mechanism of the above type in which all of the governing valves, their associated conduit structure and the throttle or auto-stop valves are rendered effective to conduct the hot steam to the turbine, so that they are all jointly heated in a gradual manner, thereby reducing thermal stresses and minimizing sudden thermal shocks which would otherwise occur as the load on the turbine is increased.

On very large steam turbines, it is highly desirable to provide a plurality of throttle or auto-stop valves and an equal number of governing valves associated with each of the throttle valves to control the admission of the hot motive steam to the turbine. Each of the governing valves is provided with its own hydraulic servomotor and its own steam chest, and controls admission of fluid to one of a plurality of arcuate nozzle chambers formed in the turbine. Heretofore, the governing valves have been sequentially operable so that steam is admitted to the turbine by one or more of the governing valves, as required to maintain the speed of the turbine constant with increasing or decreasing load.

Accordingly, during starting, with the above arrangement, all of the governing valves move to the open position until the turbine is brought up to rated speed without load. Then, all but the first or primary governing valve close as the speed governor assumes control, so that under lightly loaded conditions, for example, about 25% of full load or less, all but the primary governing valve are closed and the steam flow therethrough is interrupted. During these conditions, the thus closed governing valves and associated throttle valves and conduit structure remain at a relatively low temperature, while the primary governing valve and its associated throttle valve and conduit structure assume the considerably higher temperature of the steam flowing therethrough.

With the above arrangement, as the load on the turbine is increased, the remaining governing valves are sequentially moved to their open positions to augment the flow of hot steam to the turbine and enable it to carry the increased load. However, since these elements are initially at a considerably lower than operating temperature, as steam flow therethrough is initiated, the temperature of these components is quickly raised with attendant thermal stressing.

This invention reduces the thermal stressing occasioned by the above described control apparatus, while still minimizing the attendant throttling losses which would otherwise occur in a governing system wherein all of the governing valves are jointly movable when the turbine is running under load as well as during the starting period.

Briefly, according to the invention, there are provided a plurality of hydraulically actuated motive fluid admission valve mechanisms for controlling flow of the hot motive fluid through an equal plurality of inlets in the steam turbine. Each of the above valve mechanisms comprises a movable valve member for controlling steam admission to its associated turbine inlet and a servomotor including a hydraulically actuated power piston for actuating the valve member. The servomotor further includes a relay piston member disposed in a bore formed in a housing and dividing the bore into first and second chambers.

A manually adjustable speed governor of any suitable well known type, for example that shown in O. N. Bryant Patent No. 2,933,301, issued on April 19, 1960 and assigned to the assignee of this invention, is employed to provide a governing fluid pressure to the first chamber in accordance with the selected speed setting of the speed governor. The servomotor further includes a pilot or relay valve which is controlled by the position of the relay piston to admit pressurized hydraulic fluid to the power piston in valve opening or closing direction.

A feedback linkage mechanism, connected at one end to the power piston and pivotally connected to the relay piston by a spring member, is furhter employed to provide a restoring force to the relay piston, in a manner well known in the servomotor art.

Each of the hydraulically actuated governing valve mechanisms is arranged to operate at a different range of values of governing fluid pressure from the speed governor by designing the spring members associated with the feedback linkage mechanisms to provide a bias of different value on each of their associated relay pistons. Accordingly, as thus far described, during starting, the pressure of the governing fluid from the speed governor is at a relatively high value so that the relay pistons of all of the servomotors move in a direction to cause the power pistons to actuate their associated governing valves in opening direction. Hence, steam is concomitantly supplied to all of the nozzle chambers of the turbine until the speed of the turbine attains the value of the speed setting on the governor. Thereupon, the governing pressure from the governor will drop to a relatively low value and all but the primary admission valve mechanism will move to the closed position, since sufficient steam is provided by the primary governing valve to maintain its set speed with such partial load.

In accordance with the invention, each of the second chambers is provided with an aperture connected to an associated relief valve by a suitable conduit structure. The relief valves are each provided with a spring member biasing the former in closing direction with equal pressure, which pressure is of a very low order so that the relief valves are thereby maintained in a closed position with substantially zero pressure. Means for modifying the bias of each of the relief valve spring members at a different rate is further provided. This means may, for example, include a lever operatively associated with each of the spring members and movable relative thereto in such a manner that the first in the series of spring members is compressed a greater amount than the second of the series and the second in the series is compressed a greater amount than the third in the series, etc. The relief valves are so arranged that when their bias effect is modified by the above mechanism, the back pressure in the second chamber, opposing the governing pressure in the first chamber, provides an additional increment in the spring bias of the associated feedback spring member sufficient to equalize the operation of all of the servomotors.

With this arrangement, during starting, the relief valve biasing mechanism is moved in the direction to augment the bias of the relief valves, and steam flow is initiated to the turbine by opening all of the throttle valves and adjusting the speed governor to the rated speed of the turbine. Accordingly, as governing fluid pressure from the speed governor is applied to each of the servomotor relay piston chambers, the force of the governing fluid is opposed by the bias of the feedback spring member and the back pressure imposed by the associated relief valve, so that the pilot or relay valve members of all the servomotors are movable concomitantly in a direction to apply high pressure hydraulic fluid to their associated power pistons in a direction to open the governing valves, thereby initiating admission of steam to all of the nozzle chambers of the turbine. The governing valves will all be partially open during acceleration to rated speed of the turbine and will open wider as load is applied.

Accordingly, during this initial starting and running period, the hot steam flow is effective to heat all of the steam admission governing valves and their associated conduits and throttle valves uniformly, thereby minimizing thermal stresses in these components.

During operation of the turbine with all of the governing valves in a partially open position, such as attained at part load, throttling losses are somewhat higher than they would be if only one were fully open to provide the motive steam required to maintain the load on the turbine. To avoid these throttling losses, after the above structure is fully heated by the steam flow, the relief valve spring biasing mechanism is gradually moved to its original position, thereby decreasing the bias on the relief valves. During such movement, the primary valve will move to the fully open position and is effective to increase the flow of steam to the turbine. In a similar manner, the remaining governing valves will also move to more open positions and further increase flow of steam to the turbine. To compensate for such increase in flow rate, as the relief valve biasing mechanism is returned to its normal position the speed governor setting may be readjusted to a lower load setting until equilibrium is obtained.

The foregoing and other objects are effected by the invention as will be apparent from the following description and claims taken in connection with the accompanying drawings forming a part of this application, in which:

FIG. 1 is a highly diagrammatic perspective view illustrating a steam turbine provided with governing apparatus formed in accordance with invention;

FIG. 2 is a sectional view taken on line II—II of FIG. 1 and showing one of the hydraulically actuated motive fluid admission valve mechanisms on a considerably larger scale;

Figure 3:
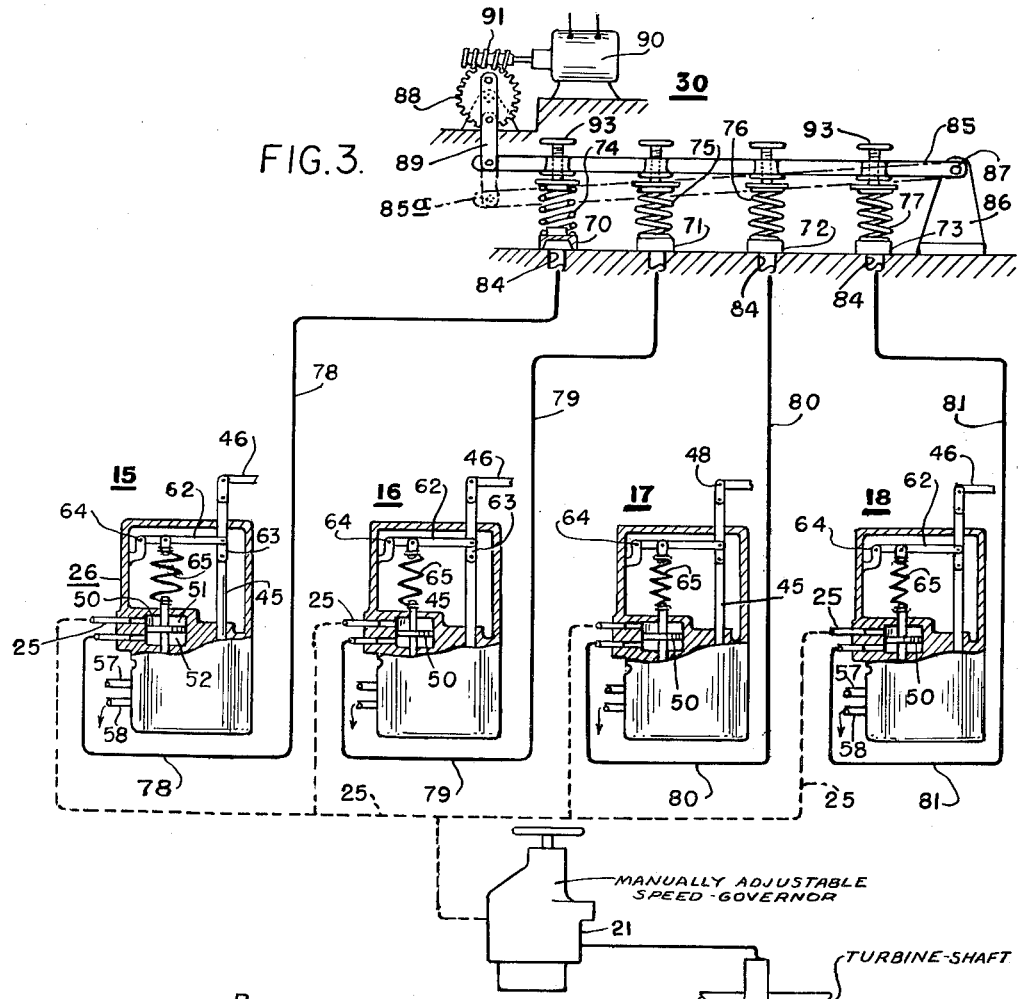
FIG. 3 is an enlarged diagrammatic view illustrating the servomotor mechanisms and their associated variable relief valve mechanisms.

Referring to the drawings in detail, in FIG. 1 there is shown a typical steam turbine unit 10 having a plurality of steam inlets 11, 12, 13 and 14 for conducting motive steam to the turbine unit. The turbine unit 10 may be of a well-known type having a plurality of arcuate nozzle chambers formed therein (not shown) each of which is connected to its associated steam inlet 11 to 14, inclusive. This type of turbine unit is known as a partial admission turbine. That is, during light loading where the power output requirements of the turbine are low, the motive steam is supplied to the turbine solely through the steam inlet 11. With increase in load requirements, however, additional motive steam is supplied to the turbine through the steam inlets 12, 13 and 14, as required. Turbines of this type are usually employed where the power output requirements are high, such as encountered in central power station equipment for the generation of electrical power for public consumption.

There are provided a plurality of hydraulically actuated motive fluid admission valve mechanisms 15, 16, 17 and 18 for controlling the flow of the hot motive steam through the turbine inlets 11 to 14, inclusive.

Associated with each of the admission valve mechanisms 15 to 18, inclusive, are an equal plurality of throttle or auto-stop valves 19 for initiating or interrupting the flow of motive steam from a suitable source of steam (not shown) to the admission valve mechanisms associated therewith.

As well known in the art, the admission valve mechanisms 15 to 18, inclusive, are controlled by hydraulic governing fluid from a hydraulic speed governor 21, which may be of the type shown in O. N. Bryant Patent No. 2,933,301, issued April 19, 1960 and assigned to the same assignee as this invention. With a speed governor of this type, pressurized hydraulic fluid, such as oil, is supplied to the governor 21 by an impeller mechanism 22 driven by the turbine unit 10, so that the hydraulic fluid directed to the governor 21 is pressurized as a function of the square of the speed of the turbine shaft 23 to which it is connected.

The governing fluid from the governor 21 is directed to each of the admission valve mechanisms by a plurality of parallel connected conduits indicated by the dotted lines 25. Each of the admission valve mechanisms is provided with a hydraulic servomotor 26 and a steam admission valve 27 actuated thereby, so that with the throttle valves 19 in the open position, the steam flow rate to the turbine unit 10 is controlled by the valves 27. The steam conduits connecting the admission valves 27 to their associated turbine inlets 11 to 14, inclusive, are indicated by the dot-and-dash lines 28.

In accordance with the invention, there is provided a mechanism, generally indicated 30 for modifying the operation of the admission valve mechanisms 15 to 18, inclusive, as will subsequently be described.

The admission valve mechanisms 15 to 18 are substantially identical structurally (although differing from each other functionally). Accordingly, only the mechanism 15 will be described in detail. As best shown in FIG. 2, the admission valve mechanism 15 comprises the admission valve 27 and the servomotor 26 for operating the admission valve. The admission valve 27 includes a valve body 33 defining a steam chamber 34 having a steam inlet 35 communicating with its associated throttle valve 19 (FIG. 1) and a steam outlet 36 communicating with the steam conduit 28. The valve 27 is further provided with a movable plug valve member 37 guided for axial movement therein by a cover plate 38 and having a fulcrum member 39 connected to the body 33.

The servomotor 26 comprises a body 40 having a bore 41 formed therein, within which is slidably disposed a power piston 42 dividing the bore into upper and lower chambers 43 and 44. The power piston 42 is further provided with a rod 45 extending through the body 40 and connected to the movable plug valve member 37 by a lever 46. The lever 46 is pivotally connected at one end to the fulcrum 39 by a pivot 47, at its other end to the piston rod 45 by a pivot 48, and intermediate its end portions to the movable valve member 37 by a pivotal connection 49.

The servomotor 26 is further provided with a relay piston 50 slidably disposed in a bore and dividing the same into upper and lower chambers 51 and 52, respectively. The relay piston 50 is connected to or otherwise associated with a reciprocable pilot or relay valve member 53 disposed in a bore 54 and movable axially to control admission of high pressure hydraulic fluid through a pair of ports 55 and 56 to the power piston chambers 43 or 44, which hydraulic fluid is directed thereto by a conduit 57 connected to a suitable source (not shown) and drained therefrom through a conduit 58, in a manner more fully described in A. F. Schwendner Patent No. 2,225,321, issued on December 17, 1940 and assigned to the same assignee as this invention. Accordingly, this portion of the servomotor need not be further described.

However, from a review of FIG. 2, it will be noted that when the relay valve 53 is in the null position shown, hydraulic fluid is neither admitted to nor bled from the power piston chambers 43 and 44 and the plug valve 37 is in the substantially closed position shown. When the relay valve 53 is moved downwardly to a lower position, hydraulic fluid is directed from the supply conduit 57, through port 56, to the lower chamber 44 and, concomitantly therewith, some of the fluid in the upper chamber 43 is bled therefrom through port 55 to the conduit 58 with attendant upward movement of the power piston 42, thereby effecting movement of the plug valve member 37 upwardly in opening direction. When the relay valve 53 is moved upwardly to a higher position than the null position shown, the high pressure fluid is directed through port 55 to the upper chamber 43 and some of the fluid in the lower chamber 44 is bled therefrom through the port 56 to the conduit 58, with attendant downward movement of the power piston 42, thereby moving the plug valve member 37 downwardly in closing direction. Accordingly, the flow of motive steam to the associated steam inlet 11 of the turbine unit is regulated in the above manner.

The relay piston 50 is further provided with a rod portion 60 which is connected to the rod portion 45 of the power piston by a feedback linkage mechanism which includes a lever 62 pivotally connected at one end to the piston rod 45 by an intermediate link 63, at its opposite end to the servomotor body 40 by a pivotal connection 64, and intermediate its ends to the relay piston rod 60 by a helical spring 65. With the relay piston 50 and the power piston 42 in the null position shown, the upward bias of the spring member 65 on the relay piston 50 is at a normal or intermediate value. However, when the power piston moves upwardly, the tension of the spring 65 is increased so that its lifting bias on the relay piston 50 is also increased. Conversely, when the power piston 42 is moved downwardly from a null position, the tension of the spring 65 is reduced and its lifting bias on the relay piston 50 is accordingly reduced to a lower value. This arrangement provides a restoring force tending to return the relay piston to its null position, thereby minimizing hunting of the valve 37.

The upper chamber 51 is provided with an inlet 67 which is connected to the speed governor 21 by the conduit 25 so that the position of the relay piston 50 is dependent upon the net value of the governing fluid pressure from the governor 21 minus the bias effect of the spring member 65. During upward movement of the relay piston 50, fluid from the upper chamber 51 is bled past the piston into the lower chamber 52 by the loosely fitting characteristics of the piston 50 in its bore, as well known in the art.

Although each of the admission valve mechanisms are substantially identical, as described above, they differ from each other in the characteristics of the spring members 65. That is, the spring members 65 are so formed that they provide a bias of different value on each of their associated relay pistons 50. Accordingly, as thus far described, during starting of the steam turbine unit 10, the pressure of the governing fluid from the speed governor 21 is at a relatively high value so that the relay pistons 50 of all of the servomotors move downwardly and cause the relay valves 53 to move to their lower positions. High pressure oil from the conduits 57 is thus admitted to the lower chambers 44 and bled from the upper chambers 43, and the power pistons 42 jointly move in upward direction to effect opening of all of the plug valve members 37 in the admission valves 27. Accordingly, steam is concomitantly supplied to all of the steam inlets 11 to 14 of the steam turbine, until the speed of the turbine attains the value of the speed setting of the governor. As the speed setting of the governor is attained by the turbine, the governing pressure from the governor will drop to a lower value. Since the characteristics of the springs 65 are different, the relay pistons 50 which are connected to spring members 65 of greater lifting bias will move upwardly, thereby effecting movement of their associated plug valve members 37 in closing direction. Since sufficient steam may be provided by only one of the admission valves to maintain the speed setting of the turbine at partial load (usually up to about 25 percent of rated load), the spring members 65 are usually designed so that all of the steam admission valves 27 but one will fully close under the above conditions.

The admission valve mechanism having the first admission valve to open and the last to close is usually referred to as the primary admission valve mechanism, and has been indicated as 15.

With the above arrangement, the throttling losses through the admission valves are minimized, since the valves are not moved to their open positions unless required to augment the steam supply to the turbine. However, during periods of light loading, only the turbine steam inlet 11 and the conduit structure 28 associated with the primary valve mechanism 15 assume operating temperatures, as determined by the temperature of the motive steam flowing therethrough, so that, when the load requirements on the turbine unit 10 are increased, the remaining admission valve mechanisms 16, 17 and 18, their associated conduit structures 28 and the steam inlets 12, 13 and 14, are subjected to high thermal stresses incident to initiation of hot motive steam flow therethrough.

In order to minimize such high thermal stressing and thermal shock to the above structure, there is provided the mechanism 30 (FIG. 1) for modifying the operation of the valve mechanisms 15 to 18, inclusive.

Referring to FIGS. 1 and 3, the mechanism 30 includes a plurality of relief valves 70, 71, 72 and 73 biased in closing direction by springs 74, 75, 76 and 77. Relief valve 70 is connected to the lower chamber 52 of the valve mechanism 15 by conduit 78, while relief valves 71 to 73, inclusive, are connected to the lower chambers 52 of the valve mechanisms 16 to 18, inclusive, by conduits 79 to 81, inclusive.

The relief valves 70 to 72, inclusive, may be of the cup type shown and arranged in covering relation with ports 84. The relief valves are substantially equally spaced from each other and their biasing springs 74 to 77 are disposed in compressive abutment with a lever 85 pivoted at one end to a support member 86 by a pivot 87 and operatively connected to a gear 88 at its opposite end by a linkage 89. The gear 88 is disposed in driven connection with a suitable reversible motor 90 by a worm gear 91. The direction of rotation of the motor 90 may be controlled by a suitable reversing control mechanism 92. The springs 74 to 77 of the relief valves are substantially identical but, to assure close individual adjustment of the springs 74 to 77, a plurality of set screws 93 may be provided in the lever 85. The springs are so arranged that when the lever 85 is in the upper position shown in FIG. 3 in solid lines, their bias on their associated cup valves 70 to 73 is of a very low order and approaches zero, so that fluid from their associated servomotors 26 may be expelled past the cup valves with substantially no back pressure. However, when the lever is positioned at its lowermost extreme, as indicated in dotted lines by 85a, which position is effected by the motor 90, the compressive bias of the springs on their associated cup valves is increased. However, since the relief valve 70 is disposed farthest from the pivot 87 as a fulcrum for the lever 85, while the remaining relief valves 71 to 73, inclusive, are disposed progressively nearer the fulcrum point of the lever, the increase in bias on the relief valve 70 is considerably larger that that of 71 and, similarly, the bias on relief valve 71 is larger than that of 72, etc.

As illustrated schematically in FIG. 3, the spring member 65 in the valve mechanism 15 has a smaller bias than the spring member 65 in valve mechanism 16, and the bias of spring 65 in valve mechanism 16 is smaller than that of valve mechanism 17, etc. The spring bias of the relief valves is adjustable to sufficiently high values to increase the back pressure in the lower chambers 52 of their associated valve mechanisms to a value such that the operating characteristics of all of the relay pistons 50 are equalized. Accordingly, when the lever 85 of the biasing mechanism 30 is in the lower position 85a, all of the valve mechanisms 15 to 18, inclusive, operate jointly in response to governing fluid pressure directed thereto by conduits 25 from the speed governor 21. Conversely, when the lever is in the upper position the valve mechanisms 15 to 18, inclusive, operate sequentially as previously described so that the primary valve mechanism 15 will remain open during periods of light loading on the turbine unit 10.

By way of example, and not by way of limitation, the following may be the operating characteristics of the valve mechanisms 15 to 18, with the mechanism 30 disposed in the position shown in solid lines (relief valve pressure equal to zero):

| Valve Mechanism (No.) | (Column 1) Initial Opening Pressure (p.s.i.) | (Column 2) Wide Open Pressure (p.s.i.) |
|---|---|---|
| 15 | 20 | 26.25 |
| 16 | 26.25 | 32.5 |
| 17 | 32.5 | 38.75 |
| 18 | 38.75 | 45 |

The bias on the relief valves with the lever 85 in the lower position 85a is as follows:

| Relief Valve (No.) | (Column 3) Bias (p.s.i.) |
|---|---|
| 70 | 25 |
| 71 | 18.75 |
| 72 | 12.5 |
| 73 | 6.25 |

Accordingly, during starting, with the lever 85 in the position 85a, the operating characteristics of the valve mechanisms is as follows:

| Valve Mechanism (No.) | (Column 4) Initial Opening Pressure (p.s.i.) | (Column 5) Wide Open Pressure (p.s.i.) |
|---|---|---|
| 15 | 45 | 51.25 |
| 16 | 45 | 51.25 |
| 17 | 45 | 51.25 |
| 18 | 45 | 51.25 |

The values shown in column 4 are obtained by adding the values in columns 1 and 3, while the values shown in column 5 are obtained by adding the values in columns 2 and 3.

Figure 4:
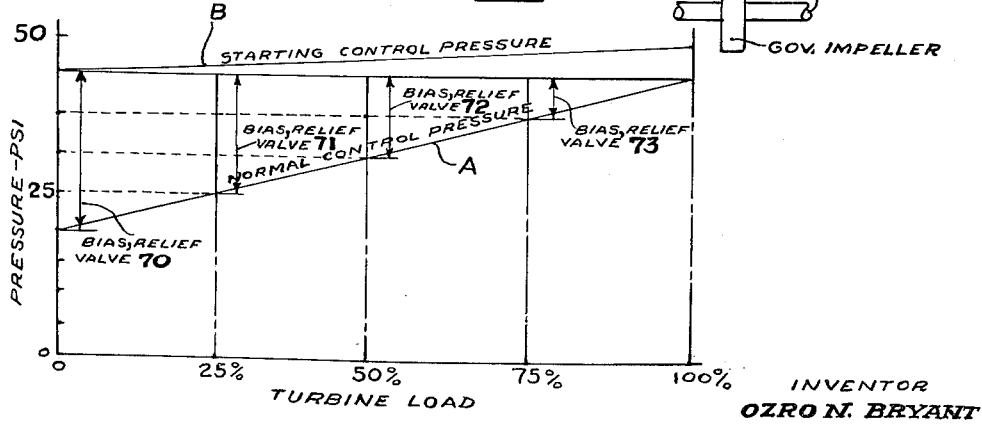
FIG. 4 is a chart illustrating operating characteristics for the hydraulically actuated motive fluid admission valve mechanisms.

In FIG. 4 there is shown a chart having percent load on the turbine as abscissa and governing fluid pressure in p.s.i. as ordinates. Line A, labeled "Normal Control Pressure," indicates the sequential opening characteristics of the valve mechanisms 15 to 18, inclusive, when the back pressure applied by the relief valves 70 to 73, inclusive, is substantially zero (see columns 1 and 2, above). Line B, labeled "Starting Control Pressure," indicates the joint operating characteristics of the valve mechanisms 15 to 18, inclusive, with back pressure applied by the relief valves to the valve mechanisms (see column 3 above).

From the above it will seen that, when the lever is in the position shown at 85a, the back pressure induced by the relief valve mechanisms is sufficient to cause all of the valves to open jointly at a governing fluid pressure of 45 p.s.i. and to attain the fully open position at 51.25 p.s.i. (Line B). Thus, during starting, warming, and initial loading, the lever 85 is maintained in the lower position 85a, so that all of the valves operate in unison and are uniformly heated by the steam flow therethrough in a gradual and uniform manner.

With the lever 85 in the lower position and the speed governor set to maintain the speed of the turbine unit 10 at a selected speed with no load, the system is stabilized for operation with all of the valve mechanisms operating jointly, as described above. However, in order to minimize throttling losses through the partially opened admission valves 27, it is desirable to revert to sequential operation of the valve mechanisms (Line A) during normal running operation of the turbine unit with load. There are several methods of reverting to sequential operation:

*Method No. 1*

The lever 85 is gradually moved from the lower position 85a to its extreme upper position, thereby slowly reducing the bias on the relief valves 70 to 73, inclusive, with resultant reduction in back pressure on their associated valve mechanisms 15 to 18 inclusive. During this operation all of the admission valves 27 will tend to move to more open positions. To counteract this effect, the speed governor 21 is concomitantly readjusted gradually to a lower setting thereby maintaining the speed of the turbine at its rated speed under the load which it is carrying. Thereafter, the governor is adjusted, in the usual manner, to control the turbine with varying load.

*Method No. 2*

While maintaining the lever in its lower position 85a, the speed governor 21 is adjusted to maintain the rated speed of the turbine as the turbine assumes the load, to any desired value of load. During such adjustment of the governor, the governing pressure to the valve mechanisms 15 to 18 is increased, thereby causing all of the admission valves 27 to move to more open positions. Immediately thereafter, the lever 85 is gradually raised to its upper position, and during such movement of the lever, the speed governor is readjusted to a lower setting. Thereafter, as in the first method, regulation of the turbine is attained by adjustment of the governor.

With both of the above methods, the valve mechanisms revert to sequential operation, so that, by referring to FIG. 4, at 25 percent load, only the primary valve mechanism 15 is fully open and the remaining valve mechanisms are fully closed, while at 50 percent load valve mechanism 16 is also fully open, etc. That is, the valve mechanisms are actuated, as required, to provide sufficient motive steam to the turbine to maintain rated speed under the load which is carried.

Method No. 1 appears to be preferable, particularly if full load is to be carried by the turbine unit.

It will now be seen that the invention provides a highly improved motive fluid governing apparatus for a turbine which permits all of the steam supplying inlets as well as their associated valve and conduit structure to be warmed before full load is applied to the turbine unit, so that thermal stresses are minimized.

It will further be seen that the invention provides a highly flexible governing system wherein a plurality of hydraulically actuated valve mechanisms are operated in one manner during starting to promote uniform warming of the motive steam carrying components, and subsequently operated in a second manner to minimize throttling losses in the motive steam flow.

Although the relief valves 70 to 73, inclusive, act upon the valve mechanisms in a direction tending to retard closing of the admission valves 27, they do not interfere with the operation and control function of the governor 21 at any time. For example, should the load being carried by the turbine unit 10 be suddenly "lost," the controlling action of the governor will cause the admission valves to fully close regardless of the modifying effect of the mechanism 30.

While the invention has been shown in but one form, it will be obvious to those skilled in the art that it is not so limited, but is susceptible of various changes and modifications without departing from the spirit thereof.

What is claimed is:

1. A prime mover driven by hot elastic motive fluid and having a plurality of motive fluid inlets, a plurality of hydraulically actuated motive fluid admission valve mechanisms for controlling motive fluid flow through said inlets, each of said valve mechanisms comprising a housing having a bore, a piston member slidably disposed in said bore and dividing the latter into first and second chambers, spring means for biasing said piston member in one direction, an adustable hydraulic speed governor for providing pressurized control fluid to said first chamber, said control fluid pressure varying with the speed setting of said governor and the speed of said prime mover, means for supplying fluid to said second chamber, a conduit for venting said second chamber, a spring biased relief valve for restricting fluid flow from said venting conduit, and means for jointly modifying the spring bias on each said relief valve, said motive fluid admission valves being operable sequentially when said modifying means is in one position and operable jointly when said modifying means is in another position.

2. An elastic motive fluid driven prime mover having a plurality of motive fluid inlets, a plurality of hydraulically actuated motive fluid admission valve mechanisms, each of said valve mechanisms comprising a movable valve member for controlling flow of hot motive fluid through said inlets, a power piston for positioning said valve member, a housing having a bore, a relay piston member slidably disposed in said bore and dividing the latter into first and second chambers, a relay valve member controlled by said relay piston, a source of pressurized hydraulic fluid, said relay controlling flow of said hydraulic fluid to and from said power piston, spring means for biasing said relay piston member in one direction, an adjustable hydraulic speed governor for providing pressurized control fluid to said first chamber, said control fluid pressure varying with the setting of said governor and the speed of said prime mover, means for supplying fluid to said second chamber, a conduit for venting said second chamber, a spring biased relief valve for restricting fluid flow from said venting conduit, and means for jointly modifying the spring bias on each said relief valve, said motive fluid admission valves being operable sequentially when said modifying means is in one position and operable jointly when said modifying means is in another position.

3. A prime mover driven by hot elastic motive fluid and having a plurality of motive fluid inlets; a plurality of hydraulically actuated motive fluid admission valve mechanisms for sequentially controlling motive fluid flow through each of said inlets; each of said valve mechanisms comprising a movable valve member, a housing having a bore, a piston member slidably disposed in said bore and dividing the latter into first and second chambers, said piston member controlling movement of said valve member, a spring member for biasing said piston member in valve closing direction; a hydraulic speed governor for providing pressurized hydraulic fluid to said first chamber, said hydraulic fluid pressure varying with the speed setting of said governor and the speed of the prime mover; each said spring member having a different bias effect on its associated piston member, means for supplying fluid to said second chamber, a conduit for venting said second chamber, a spring biased relief valve for restricting fluid flow from said venting conduit; and means for modifying the spring bias on each said relief valve to a different value sufficient to equalize the net bias on all of the piston members.

4. For use with an elastic motive fluid driven prime mover having a plurality of motive fluid inlets; the combination comprising a plurality of hydraulically actuated motive fluid admission valve mechanisms, each of said valve mechanisms having a movable valve member for individually controlling hot motive fluid flow through an associated inlet, an adjustable hydraulic speed governor for providing pressurized hydraulic fluid to said valve mechanisms for actuating said valve members, said hydraulic fluid pressure varying with the speed of the prime mover and the setting of said governor, means of different value biasing said valve mechanisms so that they move in opening direction in sequence with increase in pressure of the hydraulic fluid, and means for modifying the operation of said valve mechanisms, said modifying means including a plurality of relief valves for controlling venting of fluid from said valve mechanisms, spring means for individually biasing said relief valves in fluid flow blocking direction, and means for increasing the bias of each of said spring means individually to a different degree sufficiently to cause said valve members to jointly move in opening direction.

5. For use with an elastic motive fluid driven prime mover having a plurality of motive fluid inlets; the combination comprising a plurality of hydraulically actuated motive fluid admission valve mechanisms, each of said valve members having a movable valve member for individually controlling hot motive fluid flow through an associated one of said inlets, an adjustable hydraulic speed governor for providing pressurized hydraulic fluid to said valve mechanisms for actuating said valve members, said hydraulic fluid pressure varying with the adjustment of said governor and the speed of the prime mover, means of different value biasing said valve mechanisms so that they move said valve members in opening direction in sequence with increase in pressure of the hydraulic fluid, and means for initially converting the operation of said valve mechanisms from sequential to joint operation, said converting means including a plurality of relief valves for controlling venting of fluid from said valve mechanisms, spring means for biasing said relief valves in fluid flow blocking direction, and means for preliminarily increasing the bias of each of said spring means individually to a different degree sufficiently to cause said hydraulic fluid pressure to jointly move said valve members in opening direction during starting of said turbine and for subsequently decreasing the bias of each of said spring means to its original degree to cause said valve members to operate sequentially.

6. For use with an elastic motive fluid driven prime mover having a plurality of motive fluid inlets; the combination comprising a plurality of hydraulically actuated motive fluid admission valve mechanisms, each of said valve mechanisms comprising a servomotor and a valve having a movable valve member for individually controlling motive fluid flow through an associated inlet, said servomotor having a bore, a relay piston disposed in said bore and dividing said bore into first and second chambers, said relay piston controlling said valve member, means for supplying hydraulic fluid to said second chamber, an adjustable hydraulic speed governor for providing pressurized hydraulic fluid to said first chamber of each of said valve mechanisms for actuating said relay pistons, said hydraulic fluid pressure varying with the adjustment of said governor and the speed of the prime mover, said servomotors being arranged to move said valve members in opening direction in a predetermined sequence with increase in pressure of the hydraulic fluid, and means for modifying the operation of each of said valve mechanisms, said modifying means including a plurality of relief valves, each of said relief valves controlling venting of the hydraulic fluid from said second chamber of an associated servomotor, spring means for individually biasing said relief valves in fluid flow restricting direction, and means for increasing the bias of each of said spring means individually to a different degree sufficiently to cause said relay pistons to move jointly and actuate said valve members jointly in opening direction.

References Cited in the file of this patent
UNITED STATES PATENTS 2,383,219    Schwendner _____ Aug. 21, 1945